(12) United States Patent
Kastner et al.

(10) Patent No.: US 9,476,541 B1
(45) Date of Patent: Oct. 25, 2016

(54) MOUNTING DEVICE

(71) Applicants: Carlos A. Kastner, Naples, FL (US); Paul A. Kastner, Naples, FL (US)

(72) Inventors: Carlos A. Kastner, Naples, FL (US); Paul A. Kastner, Naples, FL (US)

(73) Assignee: Strap Shade, Inc.

( * ) Notice: Subject to any disclaimer, the term of this patent is extended or adjusted under 35 U.S.C. 154(b) by 0 days.

(21) Appl. No.: 14/328,086

(22) Filed: Jul. 10, 2014

(51) Int. Cl.
*F16M 13/00* (2006.01)
*F16M 13/02* (2006.01)

(52) U.S. Cl.
CPC .................................. *F16M 13/02* (2013.01)

(58) Field of Classification Search
CPC ...................................................... A01K 97/10
USPC ....... 248/512, 514, 515, 516, 534, 535, 536, 248/540, 541, 67.7, 68.1, 70, 72, 74.1, 74.3, 248/229.1, 229.17, 231.85
See application file for complete search history.

(56) References Cited

U.S. PATENT DOCUMENTS

| | | | |
|---|---|---|---|
| 351,669 A | 10/1886 | Tosso | |
| 369,971 A * | 9/1887 | Stillman | 248/515 |
| 970,751 A | 9/1910 | Pranke | |
| 2,733,031 A * | 1/1956 | Morgillo | 248/514 |
| 3,902,931 A * | 9/1975 | Danciger | A47F 5/06 174/163 F |
| 3,904,161 A | 9/1975 | Scott | |
| 4,522,300 A | 6/1985 | Hamblet | |
| 5,326,059 A * | 7/1994 | Pryor | F16M 13/02 248/230.6 |
| 5,836,327 A | 11/1998 | Davis | |
| 6,032,917 A * | 3/2000 | Shannon | 248/514 |
| 6,269,990 B1 * | 8/2001 | Gray | 224/200 |
| 6,889,878 B2 * | 5/2005 | Parsons | 224/200 |
| 7,281,689 B1 * | 10/2007 | Johnston | 248/58 |
| 7,296,377 B2 * | 11/2007 | Wilcox et al. | 43/21.2 |
| 7,334,593 B2 | 2/2008 | Avery | |
| 7,448,590 B1 * | 11/2008 | Holton | 248/534 |
| 7,861,981 B2 * | 1/2011 | Olver | F16L 3/137 24/16 PB |
| 8,079,560 B2 * | 12/2011 | Blackwell | 248/229.1 |
| 8,146,879 B2 * | 4/2012 | Liao | 248/514 |
| 8,375,622 B1 | 2/2013 | Holzmann, Jr. | |
| 8,439,055 B2 * | 5/2013 | April et al. | 135/16 |
| 2007/0096004 A1 | 5/2007 | Quiambao, Jr. | |
| 2011/0012007 A1 * | 1/2011 | Brewer | 248/514 |
| 2013/0105639 A1 * | 5/2013 | Chirpich | F16L 3/137 248/73 |

FOREIGN PATENT DOCUMENTS

| | | |
|---|---|---|
| CN | 203395547 | 1/2014 |
| WO | WO99/63862 | 12/1999 |

* cited by examiner

*Primary Examiner* — Terrell McKinnon
*Assistant Examiner* — Michael McDuffie
(74) *Attorney, Agent, or Firm* — Livingston Loeffler, P.A.; Edward M. Livingston, Esq.; Bryan L. Loeffler, Esq.

(57) ABSTRACT

A mounting device (1) for supporting umbrellas (31) and other items having elongated tubular handles, such as fishing poles, tiki torches (34), flag poles, signs and so forth. The mounting device is capable of being attached to different objects having various sizes and shapes, such as chairs, coolers (32), tables (33), railings (30), ladders, tailgates, boat rails, fence posts and so forth. The mounting device has a support portion (2) that attaches to a tubular handle of an umbrella and a mounting portion that attaches to an anchoring object.

14 Claims, 3 Drawing Sheets

MOUNTING DEVICE

FIELD OF THE INVENTION

This invention relates to a mounting device used for supporting umbrellas and other objects having elongated tubular handles, and more particularly an adjustable mounting device used to attach an umbrella to various anchoring objects in order to support the umbrella in a desired position.

BACKGROUND OF THE INVENTION

Conventional umbrella holders are typically clamping devices that are only capable of being attached to a tubular frame of a beach chair. Thus, conventional umbrella holders have very limited uses as they cannot be attached to larger objects such as tables, coolers and so forth.

Therefore, a need exists for a mounting device for umbrellas and other objects having elongated tubular handles that can be attached to a variety of anchoring objects having a large range of shapes and sizes.

SUMMARY OF THE INVENTION

The primary object of the present invention is to provide a mounting device for umbrellas and other objects having elongated tubular handles that can be attached to a variety of anchoring objects having a large range of shapes and sizes.

An additional object of the present invention is to provide a mounting device that is attachable to umbrellas or other objects having elongated tubular handles with varying diameters.

An additional object of the present invention is to provide a mounting device that allows a user to adjust the angle of an umbrella or other object being supported by the mounting device.

The present invention fulfills the above and other objects by providing a mounting device for supporting umbrellas and other items having elongated tubular handles, such as fishing poles, tiki torches, flag poles, signs and so forth. The mounting device is capable of being attached to different objects having various sizes and shapes, such as chairs, coolers, tables, railings, ladders, tailgates, boat rails, fence posts and so forth. The mounting device has a support portion that attaches to a tubular handle of an umbrella and a mounting portion that attaches to an anchoring object.

The support portion attaches to elongated tubular handles of umbrellas and other objects using a bolt clamp having a threaded bolt that is inserted through a threaded aperture located on a perimeter wall of a tubular body. A substantially V-shaped channel is located in the perimeter wall of the tubular body and faces a distal end of the threaded bolt. The substantially V-shaped channel prevents the tubular handle from rolling from side to side when the threaded bolt is tightened against the tubular handle.

The mounting portion has a strap that passes through a slot located proximal to the support portion. The slot is preferably located in a housing having a mounting surface with at least one flat portion and a substantially V-shaped channel. The flat portion allows the mounting portion to be mounted to a flat surface, such as a side wall of a cooler, whereas the substantially V-shaped channel allows the device to be mounted to tubular objects, such as the frame of a chair, or to edges of objects, such as the edge of a table. The strap preferably has an adjustable length and two ends that are secured together using a buckle, hook and loop fastener or other securing mechanism.

The supporting portion and the mounting portion of the device are preferably rotatably attached to each other to allow a user to rotate the supporting portion to adjust the angle of an umbrella while the mounting portion remains mounted to an anchoring object in a stationary position. The rotation may be accomplished preferably using a male tubular portion that engages a female tubular portion. A locking mechanism locks the male portion and female portion together to prevent unwanted rotation. When the locking mechanism is disengaged, the female portion and male portion may be rotated in relation to each other.

The locking mechanism may comprise an alternating series of radial ridges on the female and male portions which may be engaged into each other by a compressible mounted spring to prevent rotation of an object being held in the device.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
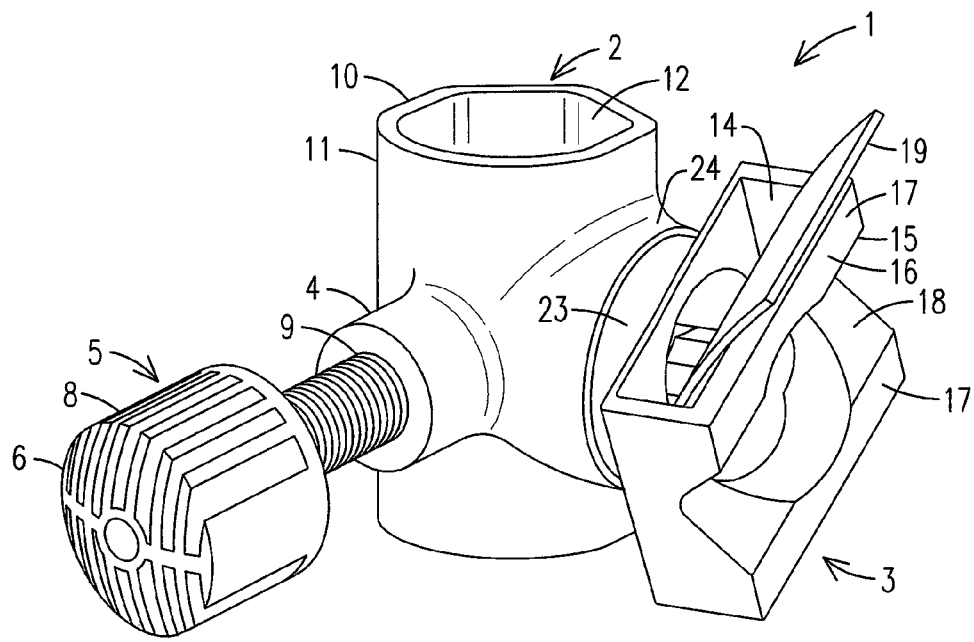
FIG. 1 is a perspective side view of a mounting device of the present invention.
Figure 2:
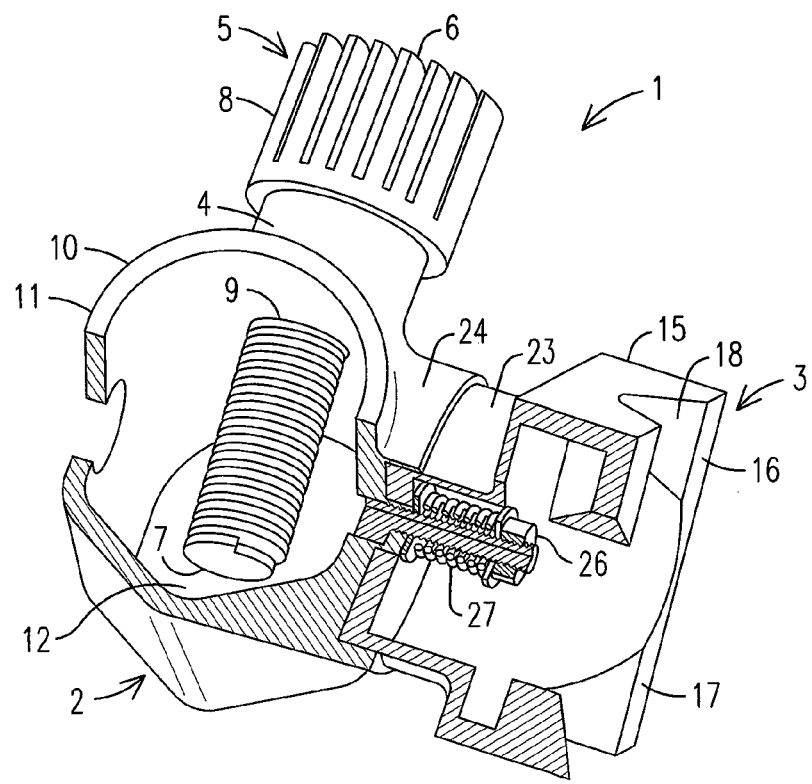
FIG. 2 is a partial cutaway view of a mounting device of the present invention.

For purposes of describing the preferred embodiment, the terminology used in reference to the numbered accessories in the drawings is as follows:

1. mounting device, generally
2. support portion
3. mounting portion
4. bolt clamp
5. threaded bolt
6. proximal end of threaded bolt
7. distal end of threaded bolt
8. head of threaded bolt
9. threaded aperture
10. perimeter wall
11. tubular body of bolt clamp
12. V-shaped channel of bolt clamp
13. strap
14. slot
15. mounting portion housing
16. mounting surface 17. flat portion of mounting surface
18. V-shaped channel of mounting surface
19. end of strap
20. attachment means
21. buckle
22. hook and loop fastener
23. male tubular portion
24. female tubular portion
25. threaded bolt
26. threaded nut
27. spring
28. raised ridge
29. recess
30. tubular railing
31. umbrella
32. cooler
33. picnic table
34. tiki torch With reference to FIGS. 1 and 2, a perspective side view and a partial cutaway view, respectively, of a mounting device 1 of the present invention is illustrated. The mounting device 1 comprises a support portion 2 that attaches to a tubular handle of an object, such as an umbrella, and a mounting portion 3 that attaches to an anchoring object, such as a chair or cooler.

The support portion 2 attaches to an elongated tubular handle of an object, such as an umbrella, using a bolt clamp 4 having a threaded bolt 5 with proximal end 6, a distal end 7 and a head 8 located on the proximal end 6. The distal end 7 of the threaded bolt 5 is inserted through a threaded aperture 9 located in a perimeter wall 10 of a tubular body 11 of the bolt clamp 4. A substantially V-shaped channel 12 is located in the perimeter wall 10 of the tubular body 11 facing the distal end 7 of the threaded bolt 5. The substantially V-shaped channel 12 prevents the tubular handle of an object from rolling from side to side in the tubular body 11 when the threaded bolt 5 is tightened against the tubular handle and the perimeter wall 10.

Figure 5:
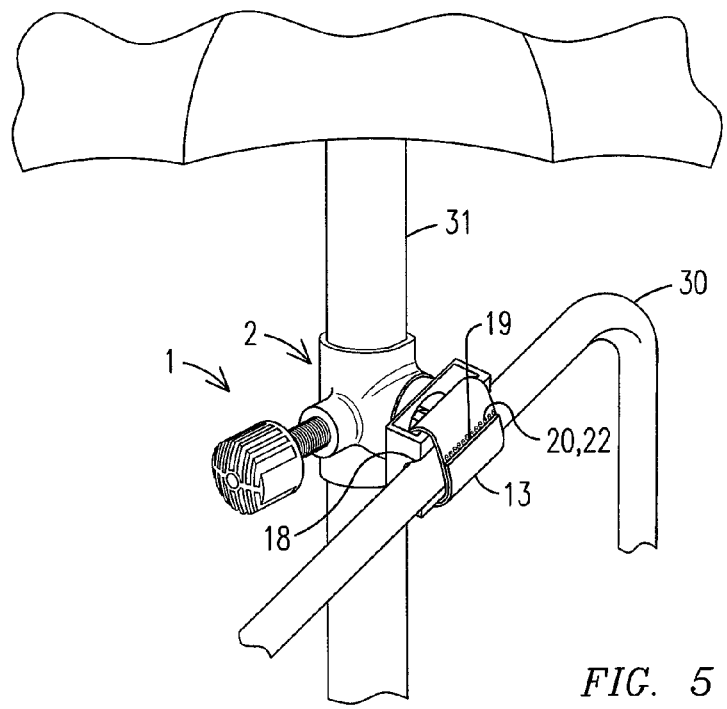
FIG. 5 is a side view of a mounting device of the present invention mounted to a tubular railing and supporting an umbrella.
Figure 6:
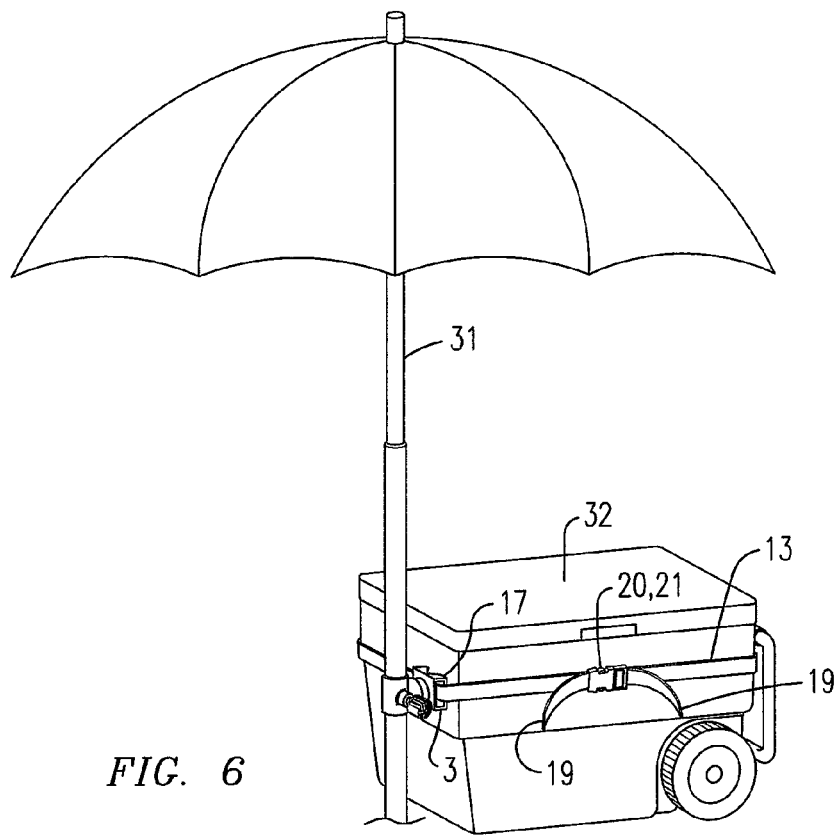
FIG. 6 is a side view of a mounting device of the present invention mounted to a cooler and supporting an umbrella.
Figure 7:
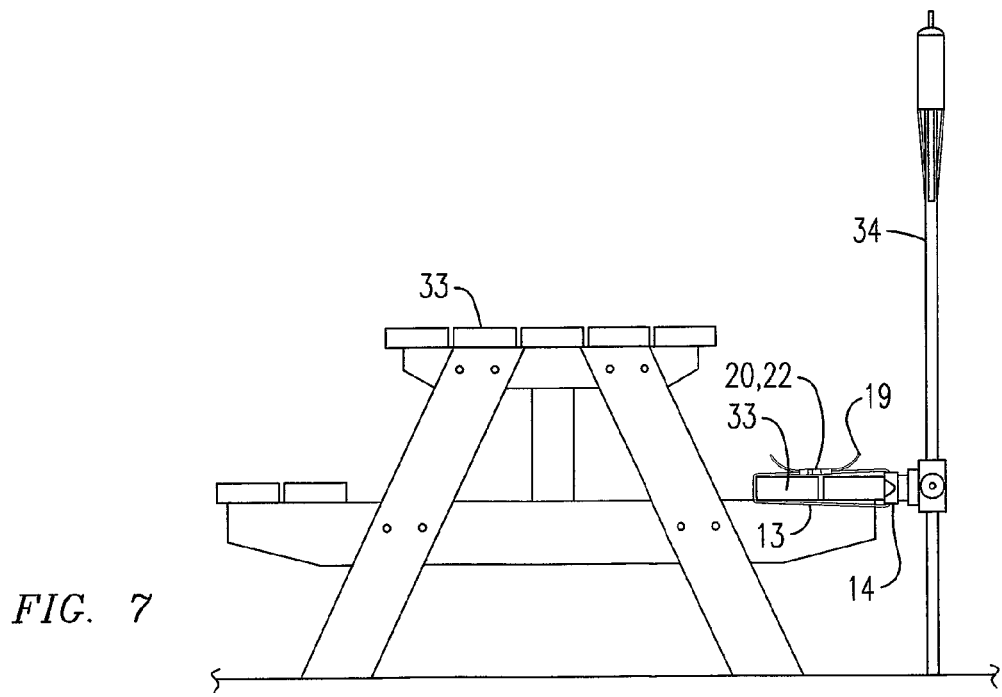
FIG. 7 is a side view of a mounting device of the present invention mounted to a picnic table and supporting a tiki torch.

The mounting portion 3 comprises a strap 13 (as shown in FIG. 5) that passes through a slot 14 located proximal to the support portion 2. The slot 14 is preferably located in a housing 15 having a mounting surface 16 with at least one flat portion 17 and a substantially V-shaped channel 18. The flat portion 17 allows the mounting portion 3 to be mounted to a flat surface, such as a side wall of a cooler, whereas the substantially V-shaped channel 18 allows the mounting portion 3 to be mounted to tubular objects, such as the frame of a chair or to edges of objects, such as a table. The strap 13 preferably has an adjustable length and two ends 19 are secured using an attachment means 20, such as a buckle 21, hook and loop fastener 22 or other fastening means, as illustrated in FIGS. 5-7.

Figure 3:
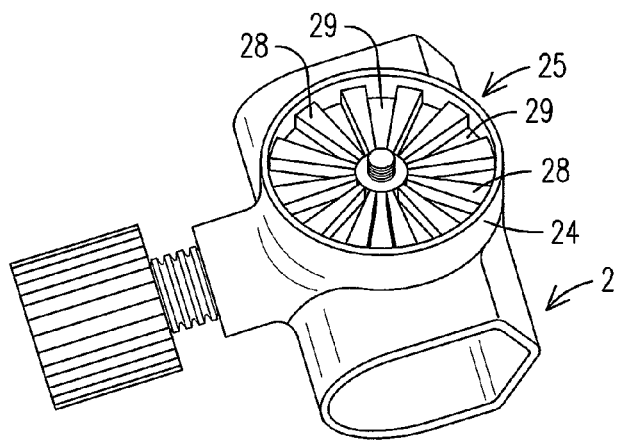
FIG. 3 is a perspective top view of a male tubular portion of the present invention.
Figure 4:
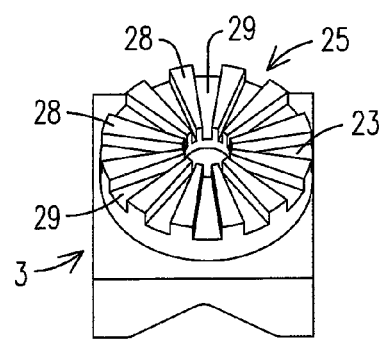
FIG. 4 is a perspective top view of a female tubular portion of the present invention.

The supporting portion 2 and the mounting portion 3 are preferably rotatably attached to each other to allow a user to rotate the supporting portion 2 to adjust the angle of an umbrella or other object while the mounting portion 3 remains mounted to an anchoring object in a stationary position. The rotation is accomplished using a male tubular portion 23 that engages a female tubular portion 24. A locking means 25 locks the male tubular portion 23 and female tubular portion 24 together to prevent rotation. The locking means may be a series of alternating raised ridges 28 and recesses 29 that engage each other, as illustrated in FIGS. 3 and 4. When the locking means is disengaged, the male tubular portion 23 and female portion 24 may be rotated in relation to each other. The male portion 23 and female portion 24 are preferably attached using a threaded bolt 25 and threaded nut 26. The locking means may also comprise a spring 27 mounted in a compressed fashion between the bolt 25 and the nut 26 that keeps the male tubular portion 23 and the female tubular portion 24 in a locked position.

With reference to FIGS. 3 and 4, a perspective top view of a male tubular portion 23 of the present invention and a perspective top view of a female tubular portion 24 of the present invention, respectively, are illustrated. A locking means 25 locks the male tubular portion 23 and female tubular portion 24 together to prevent rotation of the support portion 2 in relation to the mounting portion 3. As illustrated here, the locking means 25 is a series of alternating raised ridges 28 and recesses 29 located on the male tubular portion 23 and corresponding alternating raised ridges 28 and recesses 29 located on the female tubular portion 24 that engage each other to lock the support portion 2 in relation to the mounting portion 3 when the compressed spring 27 (illustrated in FIG. 2) provides pressure to the male tubular portion 23 against the female tubular portion 24.

With reference to FIG. 5, a side view of a mounting device 1 of the present invention mounted to a tubular railing 30 and supporting an umbrella 31 is illustrated. The mounting portion 3 comprises a strap 13 that passes through a slot 14 located proximal to the support portion 2. The substantially V-shaped channel 18 allows the mounting portion 3 to be mounted to tubular objects, such as the tubular railing 30 of a pool. The strap 13 preferably has an adjustable length and two ends 19 that are secured using an attachment means 20, such as hook and loop fastener 22. The mounting device is adjusted 1 to accommodate the angle of the tubular railing 30.

With reference to FIG. 6, a side view of a mounting device of the present invention mounted to a cooler 32 and supporting an umbrella 31 is illustrated. The mounting portion 3 comprises a strap 13 that passes through a slot 14 located proximal to the support portion 2. The flat portion 17 allows the mounting portion 3 to be mounted to a flat surface, such as a side wall of a cooler 32. The strap 13 preferably has an adjustable length and two ends 19 that are secured using an attachment means 20, such as a buckle 21.

Finally with reference to FIG. 7, a side view of a mounting device of the present invention mounted to a picnic table 33 and supporting a tiki torch 34 is illustrated. The mounting portion 3 comprises a strap 13 that passes through a slot 14 located proximal to the support portion 2. The substantially V-shaped channel 18 allows the mounting portion 3 to be mounted to an edge of an object 35, such as the edge of a picnic table 33. The strap 13 preferably has an adjustable length and two ends 19 that are secured using an attachment means 20, such hook and loop fastener 22.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

We claim:
1. A mounting device comprising:
   a support portion that attaches to a tubular handle of an object;
   a mounting portion for attachment to an anchoring object, said mounting portion attached to the support portion;

said support portion having a perimeter wall creating an enclosed tubular body with two open ends to allow an elongated object to pass completely through the support portion;

said support portion having a bolt clamp with a threaded bolt having a proximal end and a distal end;

said distal end of the threaded bolt engaging a threaded aperture located in a perimeter wall of the tubular body of the bolt clamp;

said mounting portion comprising a mounting surface having a V-shaped channel with planar surfaces extending outward a predetermined distance from upper edges of the V-shaped channel;

said planar surfaces of the mounting portion being parallel to a slot located on the mounting portion;

said slot being located behind said V-shaped channel between said V-shaped channel and said support portion in a position that does not intersect said V-shaped channel;

said mounting portion having a strap that passes through the slot located thereon; and an attachment means for securing ends of said strap together around the anchoring object.

2. The mounting device of claim 1 wherein:
said mounting surface comprises at least one substantially V-shaped channel.

3. The mounting device of claim 1 wherein:
said attachment means on said strap is a hook and loop fastener.

4. The mounting device of claim 1 wherein:
said attachment means on said strap is a buckle.

5. The mounting device of claim 1 wherein:
said supporting portion and mounting portion are rotatably attached to each other.

6. The mounting device of claim 5 further comprising:
a male tubular portion that engages a female tubular portion; and
a locking means that locks the male tubular portion and female tubular portion to prevent rotation when the device is mounted to an anchoring object.

7. The mounting device of claim 6 wherein:
said locking means comprises a series of alternating raised ridges and recesses located on the male tubular portion and the female portion.

8. The mounting device of claim 5 further comprising:
at least one spring compressibly mounted between the supporting portion and mounting portion together.

9. A mounting device comprising:
a support portion that attaches to a tubular handle of an object;
a mounting portion for attachment to an anchoring object, said mounting portion attached to the support portion;
said support portion having a bolt clamp with a threaded bolt having a proximal end and a distal end;
said support portion having a perimeter wall creating an enclosed tubular body with two open ends to allow an elongated object to pass completely through the support portion;
said distal end of the threaded bolt engaging a threaded aperture located in a perimeter wall of the tubular body of the bolt clamp;
said mounting portion comprising a mounting surface having a V-shaped channel with planar surfaces extending outward a predetermined distance from upper edges of the V-shaped channel;

said planar surfaces of the mounting portion being parallel to a slot located on the mounting portion;

said slot being located behind said V-shaped channel between said V-shaped channel and said support portion in a position that does not intersect said V-shaped channel;

said mounting portion having a strap that passes through the slot located thereon;

an attachment means for securing ends of said strap together around the anchoring object;

said supporting and mounting portions being rotatably attached to each other;

a male tubular portion that engages a female tubular portion; and a locking means that locks the male tubular portion and female tubular portion to prevent rotation when the device is mounted to an anchoring object.

10. The mounting device of claim 9 further comprising:
a substantially V-shaped channel located on the perimeter wall of the tubular body of the bolt clamp.

11. The mounting device of claim 9 wherein:
said attachment means on said strap is a hook and loop fastener.

12. The mounting device of claim 9 wherein:
said attachment means on said strap is a buckle.

13. The mounting device of claim 9 wherein:
said locking means comprises a series of alternating raised ridges and recesses located on the male tubular portion and the female portion.

14. A mounting device comprising:
a support portion that attaches to a tubular handle of an object;
a mounting portion for attachment to an anchoring object, said mounting portion attached to the support portion;
said support portion having a perimeter wall creating an enclosed tubular body with two open ends to allow an elongated object to pass completely through the support portion;
said support portion having a bolt clamp with a threaded bolt having a proximal end and a distal end;
said distal end of the threaded bolt engaging a threaded aperture located in a perimeter wall of the tubular body of the bolt clamp;
said mounting portion comprising a mounting surface having a V-shaped channel with planar surfaces extending outward a predetermined distance from upper edges of the V-shaped channel;
said planar surfaces of the mounting portion being parallel to a slot located on the mounting portion;
said slot being located behind said V-shaped channel between said V-shaped channel and said support portion in a position that does not intersect said V-shaped channel;
said mounting portion having a strap that passes through the slot located thereon;
an attachment means for securing ends of said strap together around the anchoring object; and
said tubular body of the support portion and a mounting surface of the mounting portion each being rotatable around parallel planes.

* * * * *